No. 831,009. PATENTED SEPT. 11, 1906.
A. H. KNOPF.
NUT LOCK.
APPLICATION FILED MAR. 21, 1906.
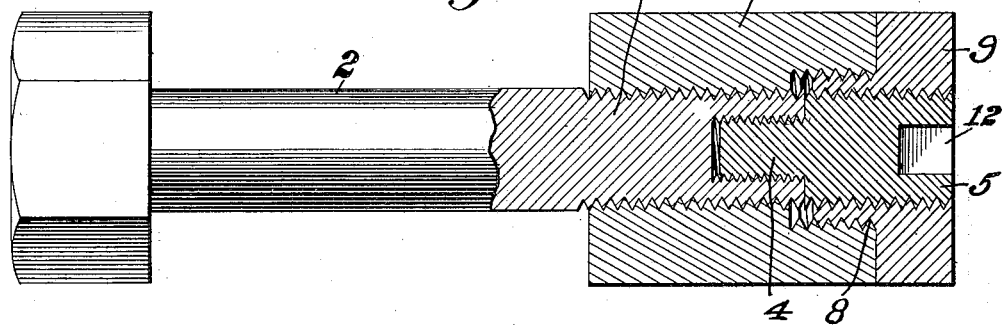
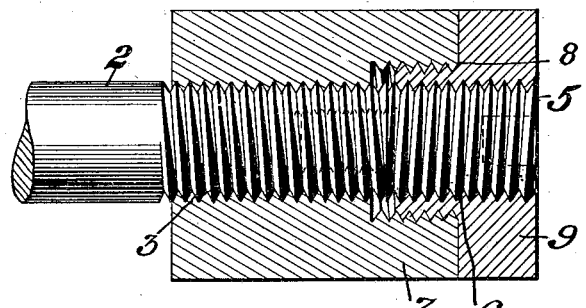
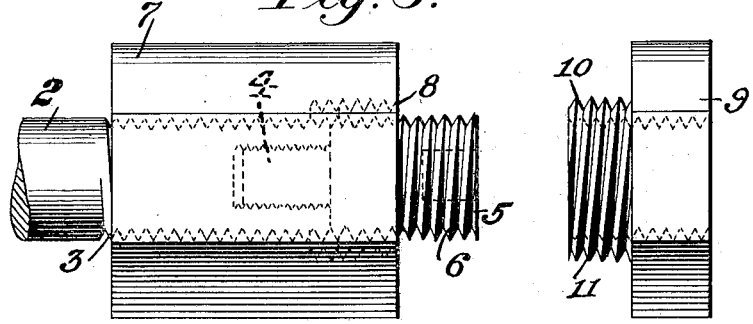
Witnesses:
Inventor:
Albert H. Knopf
by W. B. Corwin
Attorney.

UNITED STATES PATENT OFFICE.

ALBERT H. KNOPF, OF OAK HALL, PENNSYLVANIA.

NUT-LOCK.

No. 831,009.      Specification of Letters Patent.      Patented Sept. 11, 1906.

Application filed March 21, 1906. Serial No. 307,192.

*To all whom it may concern:*

Be it known that I, ALBERT H. KNOPF, of Oak Hall, in the county of Center and State of Pennsylvania, have invented a new and useful Improvement in Nut-Locks; and I do hereby declare the following to be a full, clear, and exact description of the same.

My invention relates to nut-locks of that class where two nuts have been adapted to be turned in a reverse direction to screw them upon a single bolt. Hitherto this result has been attained in several ways. One way has been to form the bolt at different portions of its length of different sizes diametrically and to provide these different-sized portions with reversely-inclined or right-hand and left-hand screw-threads, so as to adapt them to nuts made internally of sizes corresponding to them and furnished with screw-threads adapted to engage with them. This way is objectionable, because, owing to the fact that the nuts need to be located at the junction of the two different-sized portions of the bolt less range in the adjustment of the nuts is afforded than is desirable and also the bolt is weakened by such reduction of its diameter at its outer end. The other way has been to form two reversely-inclined threads upon one and the same portion of the bolt. This latter way is objectionable because of the difficulty of properly forming the threads, and, moreover, because the intersection of the threads entails the removal of so much of each thread as to materially weaken it.

The object of my invention is to produce a nut-lock of such character that the nuts may be turned in reverse directions to screw them upon the bolt without forming the bolt with reversely-inclined portions the outer one of which is of less diameter than the inner one or without forming a single portion of a bolt with reversely-inclined threads.

My invention consists in a bolt made in two pieces, each piece being provided with threads reversely inclined to those of the other piece, and a nut or nuts having threads adapted to receive and interfit with the reversely-inclined threads of the two-piece bolt.

I will now describe my invention so that others skilled in the art may manufacture and use the same, reference being had to the accompanying drawings, forming part of this specification, in which—

Figure 1 is a central longitudinal section of my invention. Fig. 2 is a similar view showing the two-piece bolt in full lines. Fig. 3 is a side elevation with the outer nut detached.

Like symbols of reference indicate like parts in each figure.

In the drawings, 2 indicates the bolt proper provided at its end with a right-hand screw-threaded portion 3. Into the outer end of this portion 3 is screwed, by means of a projecting end 4, a second portion 5 of the bolt, which is provided on its outer surface with left-hand screw-threads 6.

7 is a nut provided in its smaller bore with right-hand screw-threads to adapt it to be screwed upon the right-hand screw-threaded portion 3 of the bolt. At its outer side the nut 7 is provided with an enlarged bore 8, tapped with left-hand screw-threads.

9 is a nut tapped internally with left-hand screw-threads adapted to screw upon the left-hand screw-threads of the end 5 of the bolt and having also a projection or extension 10, provided with external left-hand screw-threads 11, adapted to screw into the enlarged bore 8 of the nut 7. The end 5 is provided with a recess 12 for engagement therewith of any suitable tightening implement.

The manner of assembling the several parts above described is as follows, viz: The nut 7 is first screwed on the bolt 2, its smaller right-hand-threaded bore screwing onto the right-hand-threaded portion 3 of the bolt. The projection 4 of the left-hand-threaded portion 5 of the bolt is now screwed into the end 3 until the two portions 3 and 5 of the bolt are brought flush together. The nut 9 is now screwed onto the end 5, its screw-threaded portion or extension 10 engaging the screw-threads of the larger bore 8 of the nut 7. When the parts are thus tightly assembled, they are securely held against movement or displacement.

I claim—

1. In a nut-lock, the combination of a bolt formed in two parts, one of said parts having a projection extending from one end and screwed into a recess in the other, so as to cause the ends of the two sections of the bolt to abut against each other and each of said parts being provided with screw-threads reversely inclined to those of the other part; and nuts having screw-threads adapted to engage the screw-threads of the said two parts; substantially as described.

2. In a nut-lock, the combination of a bolt formed in two parts of equal diameter, one of said parts having a projection screwed into a recess in the other, and each of said parts being provided with screw-threads reversely inclined to those of the other parts; and nuts having screw-threads adapted to engage the screw-threads of the said two parts; substantially as described.

3. In a nut-lock, the combination of a bolt formed in two parts, one of said parts having a projection extending from one end and screwing into a recess in the other, so as to cause the ends of the two sections of the bolt to abut against each other and each of said parts being provided with screw-threads reversely inclined to those of the other part; and nuts having screw-threads adapted to engage the screw-threads of said two parts of the bolt, the inner of said nuts having an enlarged screw-threaded bore adapted to receive a screw-threaded extension of the outer nut; substantially as described.

In testimony whereof I have hereunto set my hand.

ALBERT H. KNOPF.

Witnesses:
  C. W. COOK,
  HENRY LOWRY.